(12) United States Patent
Torii

(10) Patent No.: US 9,162,712 B2
(45) Date of Patent: Oct. 20, 2015

(54) VEHICLE UPPER-BODY STRUCTURE

(75) Inventor: Nobuyuki Torii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/355,005

(22) PCT Filed: Oct. 31, 2011

(86) PCT No.: PCT/JP2011/075097
§ 371 (c)(1),
(2), (4) Date: May 16, 2014

(87) PCT Pub. No.: WO2013/065109
PCT Pub. Date: May 10, 2013

(65) Prior Publication Data
US 2014/0300139 A1    Oct. 9, 2014

(51) Int. Cl.
*B62D 25/04* (2006.01)
*B62D 25/06* (2006.01)
*B62D 27/02* (2006.01)

(52) U.S. Cl.
CPC ............. *B62D 27/023* (2013.01); *B62D 25/04* (2013.01); *B62D 25/06* (2013.01)

(58) Field of Classification Search
CPC ....... B62D 25/04; B62D 25/06; B62D 27/023
USPC ............ 296/187.12, 187.13, 193.06, 193.12, 296/203.03, 29, 210
See application file for complete search history.

(56) References Cited

U.S. PATENT DOCUMENTS

| 5,873,618 | A | * | 2/1999 | Ejima | 296/30 |
| 8,042,863 | B2 | * | 10/2011 | Nydam | 296/210 |
| 8,662,573 | B2 | * | 3/2014 | Vantrease et al. | 296/203.03 |
| 8,740,292 | B2 | * | 6/2014 | Kishi | 296/203.01 |
| 2009/0206636 | A1 | | 8/2009 | Nydam | |
| 2011/0121614 | A1 | | 5/2011 | Kobayashi et al. | |
| 2012/0126583 | A1 | * | 5/2012 | Brown et al. | 296/210 |
| 2012/0139295 | A1 | * | 6/2012 | Huepperling | 296/193.06 |

(Continued)

FOREIGN PATENT DOCUMENTS

JP    A-10-167114    6/1998
JP    A-2001-278113    10/2001

(Continued)

OTHER PUBLICATIONS

Technical Publication of Toyota Motor Corporation No. 23772 published Feb. 28, 2011.

*Primary Examiner* — Jason S Morrow
(74) *Attorney, Agent, or Firm* — Oliff PLC

(57) ABSTRACT

A vehicle upper-body structure having a pillar reinforcement member which connects an upper portion of a pillar member and a roof reinforcement member to be reinforced, includes at least one latch portion (hook-shaped member) which is latched to the roof reinforcement member when the pillar reinforcement member is deformed by an external load, and the latch portion is provided to pass through the roof reinforcement member as a portion of the pillar reinforcement member. According to the vehicle upper-body structure, when the pillar reinforcement member is deformed by the external load, since the latch portion is latched to the roof reinforcement member, load transmission efficiency from the pillar reinforcement member to the roof reinforcement member can be improved. Moreover, compared to a case where joining is performed at one point, the number of components is not increased.

4 Claims, 5 Drawing Sheets

(56) References Cited

U.S. PATENT DOCUMENTS

2012/0153676 A1* 6/2012 Shono .................. 296/193.06
2013/0320716 A1* 12/2013 Nishimura et al. ........... 296/210
2014/0028057 A1* 1/2014 Nishimura et al. ........... 296/210

FOREIGN PATENT DOCUMENTS

| JP | A-2007-83830 | | 4/2007 |
| JP | 2009-298335 A | * | 12/2009 |
| WO | WO 2009/066552 A1 | | 5/2009 |

* cited by examiner

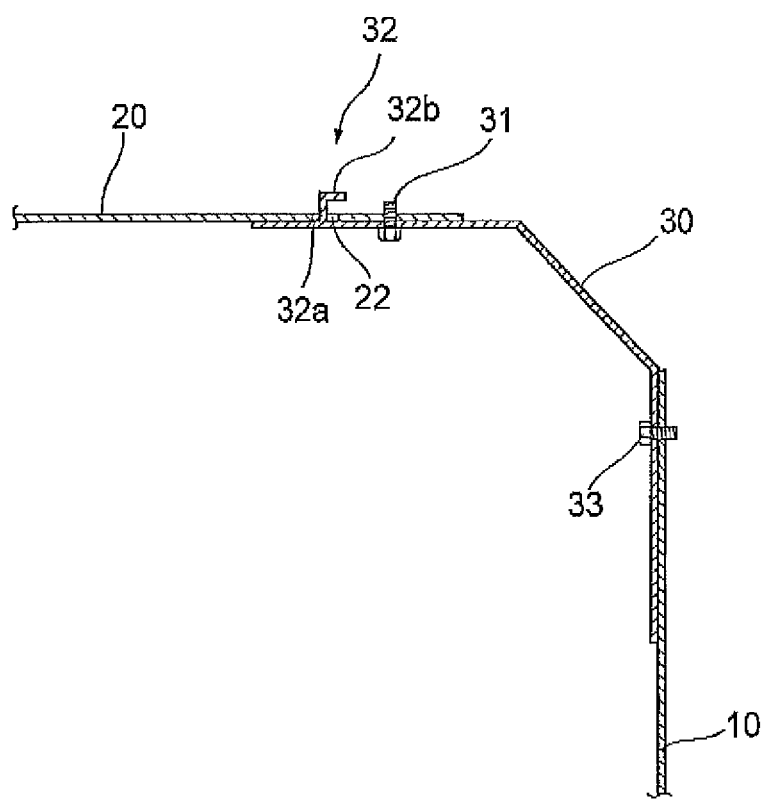

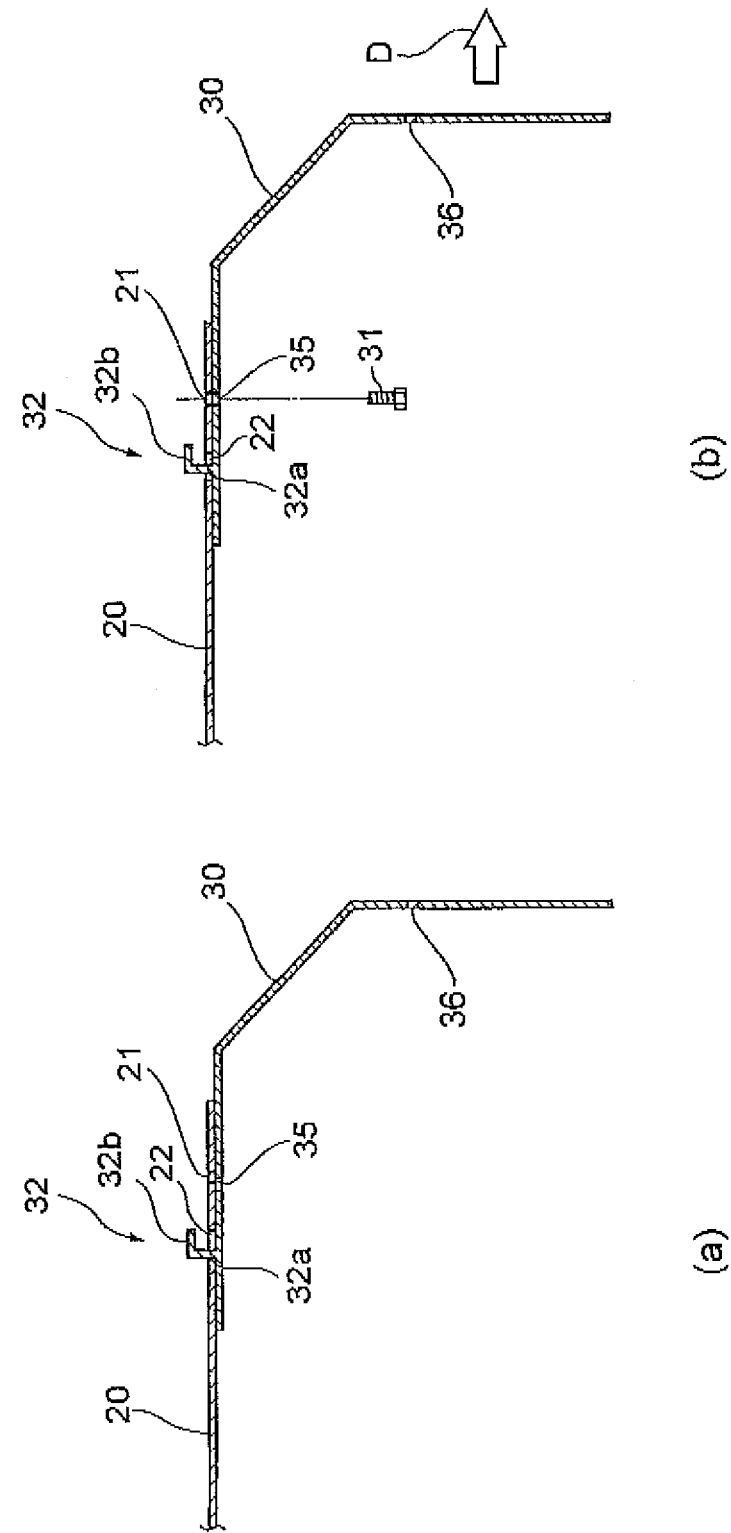

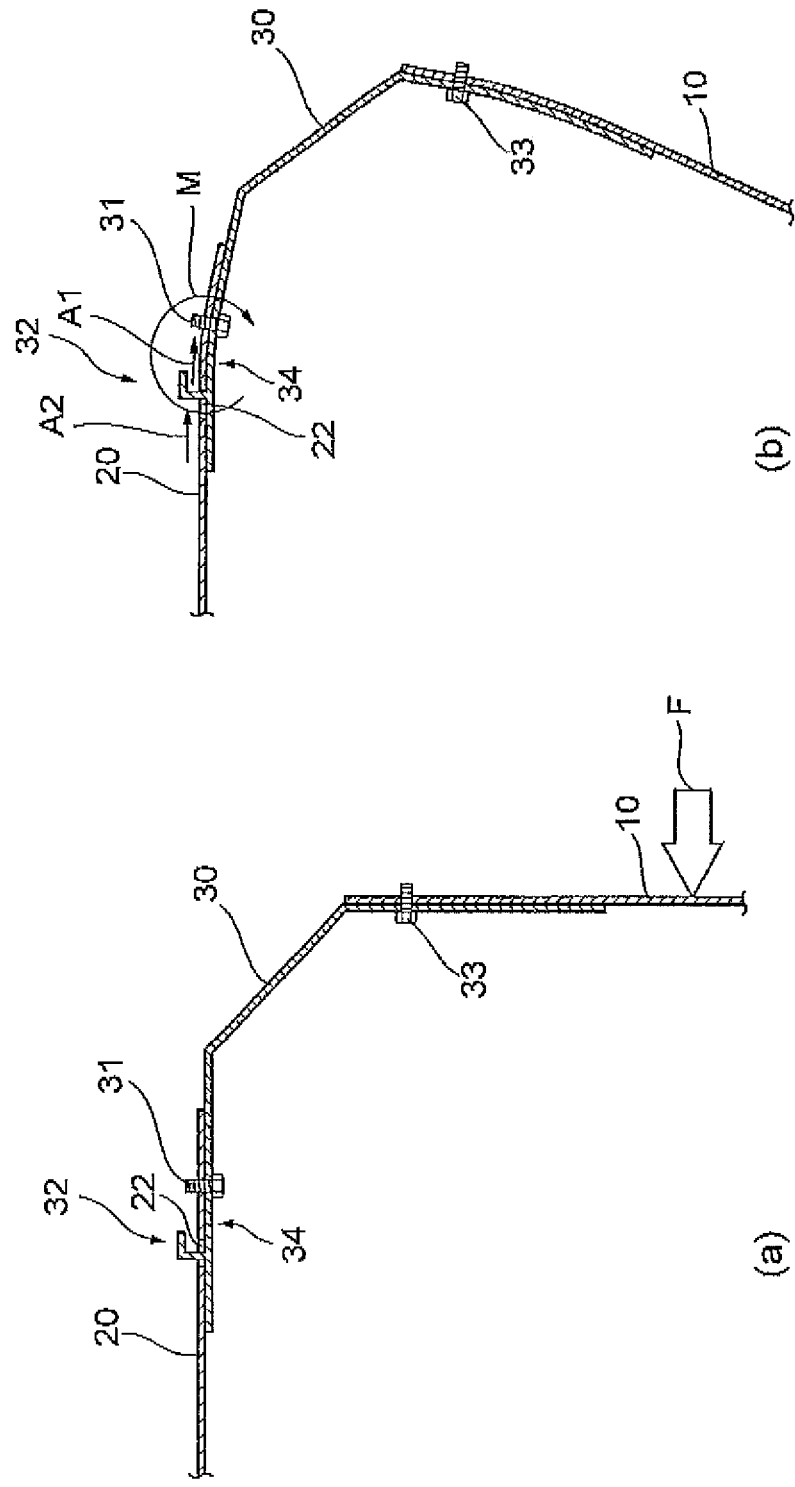

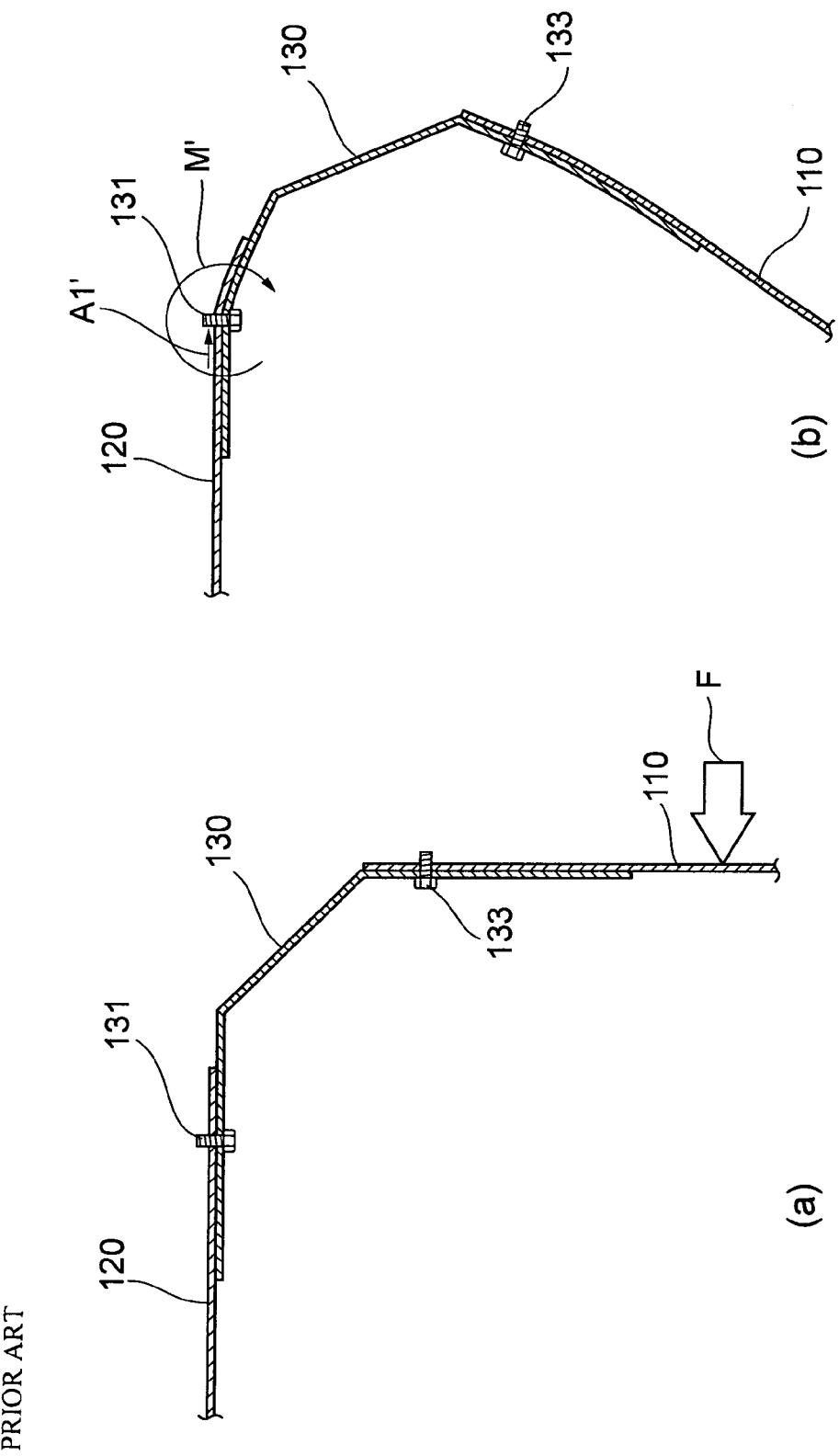

VEHICLE UPPER-BODY STRUCTURE

TECHNICAL FIELD

The present invention relates to a vehicle upper-body structure including a pillar reinforcement member which connects an upper portion of a pillar member and a roof reinforcement member to be reinforced.

BACKGROUND ART

In the related art, in a vehicle upper-body structure, a pillar reinforcement member, which connects an upper portion of a pillar member extending in a vehicle height direction and a roof reinforcement member extending in vehicle width direction to be reinforced, is provided at a location adjacent to a roof side rail along a vehicle body longitudinal direction. For example, Japanese Unexamined Patent Application Publication No. 10-167114 discloses a pillar reinforcement member (roof side reinforcement) which is fastened to a roof reinforcement member (roof bow) with bolts at two points separated in the vehicle width direction.

CITATION LIST

Patent Literature

[Patent Literature 1] Japanese Unexamined Patent Application Publication No. 10-167114

SUMMARY OF INVENTION

Technical Problem

Since the pillar reinforcement member is joined at two points separated in the vehicle width direction, compared to a case where the pillar reinforcement is joined at one point in the vehicle width direction, load transmission efficiency when an external load applied from a side or an upper side of a vehicle body is transmitted from the pillar reinforcement member to the roof reinforcement member can be improved to some extent. However, compared to the case where the pillar reinforcement is joined at one point, the number of the joint parts is increased.

Accordingly, an object of the present invention is to provide a vehicle upper-body structure capable of improving the load transmission efficiency from the pillar reinforcement member to the roof reinforcement member without increasing the number of components.

Solution to Problem

According to an aspect of the present invention, there is provided a vehicle upper-body structure including a pillar reinforcement member which connects an upper portion of a pillar member and a roof reinforcement member to be reinforced, including: at least one latch portion which is latched to the roof reinforcement member when the pillar reinforcement member is deformed by an external load, in which the latch portion is provided to pass through the roof reinforcement member as a portion of the pillar reinforcement member.

According to the aspect, when the pillar reinforcement member is deformed by the external load, since at least one latch portion is latched to the roof reinforcement member, load transmission efficiency from the pillar reinforcement member to the roof reinforcement member can be improved. In addition, since the latch portion is provided as a portion of the pillar reinforcement member, compared to a case where joining is performed at one point, the number of components is not decreased. Accordingly, the load transmission efficiency from the pillar reinforcement member to the roof reinforcement member can be improved without increasing the number of components.

The vehicle upper-body structure may further include a joint portion between the roof reinforcement member and the pillar reinforcement member at a position different from the latch portion in a vehicle width direction. Accordingly, since the joint portion is provided at the position different from the latch portion in the vehicle width direction, an intermediate portion between the latch portion and the joint portion of the pillar reinforcement member is not easily bent, and thus, bending stiffness of an upper portion of the pillar member can be secured.

The latch portion may include a protrusion which is provided to protrude above from the pillar reinforcement member and restricts a movement of the pillar reinforcement member in the vehicle width direction, and a bent portion which is provided to be bent from the protrusion and restricts a movement of the pillar reinforcement member in a vehicle height direction. Accordingly, the protrusion and the bent portion restrict the movement of the pillar reinforcement member in the vehicle width direction and the vehicle height direction, and thus, the load transmission efficiency can be further increased. Moreover, when assembly of the vehicle upper-body structure is performed, the pillar reinforcement member can be easily positioned on the roof reinforcement member.

The latch portion may be provided at a further inner side than the joint portion in the vehicle width direction. Accordingly, since the latch portion is provided at the further inner side than the joint portion in the vehicle width direction, the external load applied from a side or an upper side of a vehicle body is easily transmitted to the joint portions provided on the outside in the vehicle width direction, and the transmission of the external load to the latch portion can be decreased.

Advantageous Effects of Invention

According to the present invention, it is possible to provide a vehicle upper-body structure capable of improving load transmission efficiency from a pillar reinforcement member to a roof reinforcement member without increasing the number of components.

BRIEF DESCRIPTION OF DRAWINGS

FIG. 2 is a cross-sectional view showing the vehicle upper-body structure according to the embodiment of the present invention.

FIG. 3 is a view showing an assembly method of the vehicle upper-body structure according to the embodiment of the present invention.

FIG. 4 is a view showing a behavior when an external load is applied from a side of a vehicle body to the vehicle upper-body structure according to the embodiment of the present invention.

FIG. 5 is a view showing a behavior when an external load is applied from a side of a vehicle body to the vehicle upper-body structure according to the related art.

DESCRIPTION OF EMBODIMENTS

Figure 1:
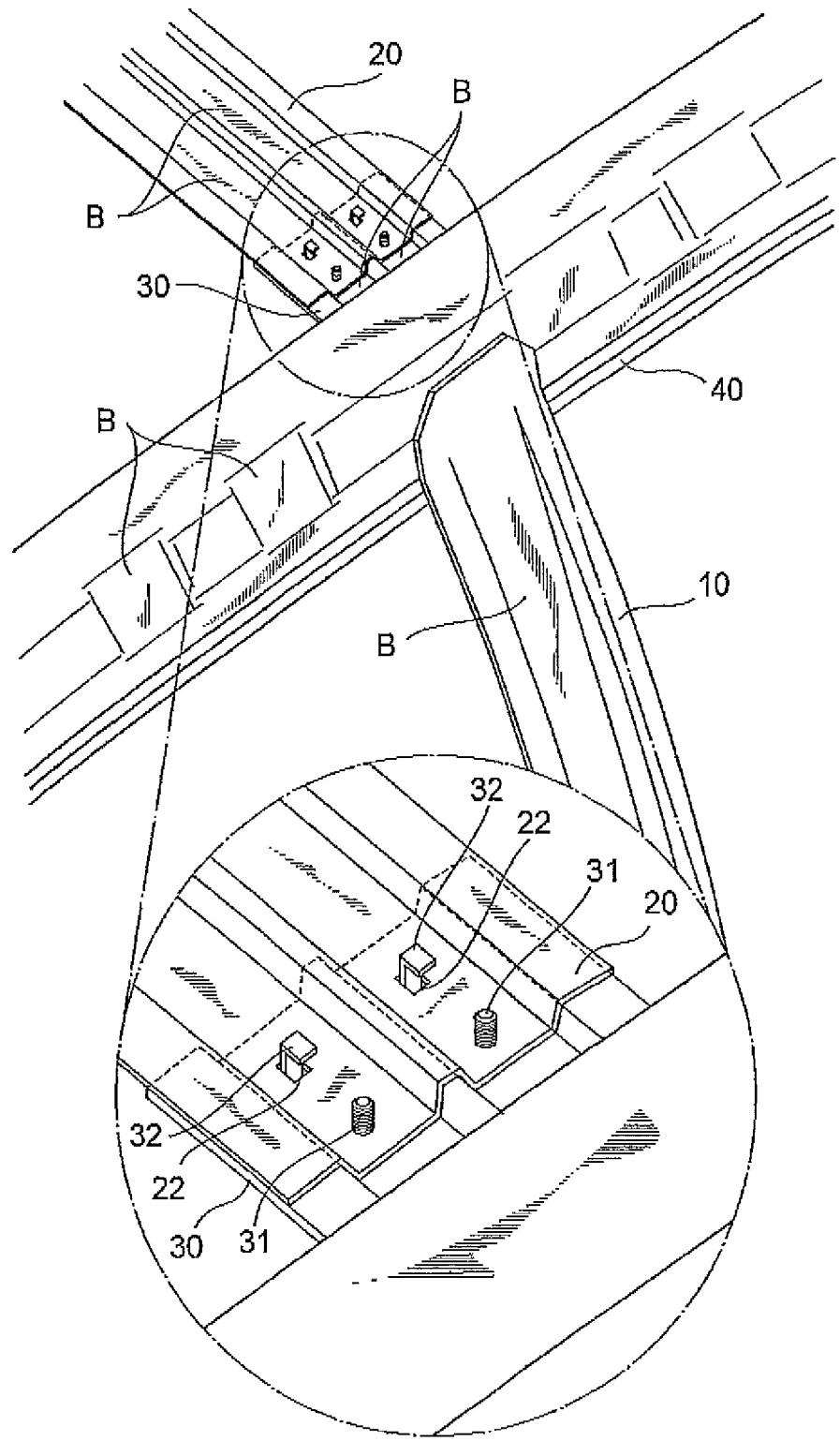
FIG. 1 is a perspective view showing a vehicle upper-body structure according to an embodiment of the present invention.

Hereinafter, an embodiment of the present invention will be described in detail with reference to the accompanying drawings. In addition, the same reference numerals are assigned to the same components in the description of the drawings, and overlapping description is omitted.

First, with reference to FIGS. 1 and 2, a configuration of a vehicle upper-body structure according to the embodiment of the present invention will be described. FIG. 1 is a perspective view showing the vehicle upper-body structure according to the embodiment of the present invention, and FIG. 2 is a cross-sectional view showing the vehicle upper-body structure according to the embodiment of the present invention. In FIG. 1, a joint portion between a roof reinforcement member 20 and a pillar reinforcement member 30 is shown to be enlarged. Moreover, in FIG. 2, for convenience of the description, a roof side rail 40 is not shown.

The vehicle upper-body structure includes a pillar reinforcement member 30 which connects pillar member 10, particularly, an upper portion of a center pillar member and the roof reinforcement member 20 to be reinforced. As shown in FIG. 1, the pillar reinforcement member 30 connects the upper portion of the pillar member 10 extending in a vehicle height direction (approximately up-down direction in FIG. 2) and the roof reinforcement member 20 extending in a vehicle width direction (approximately right-left direction in FIG. 2) to be reinforced at a location adjacent to the roof side rail 40 along a vehicle body longitudinal direction. In addition, a case where one roof reinforcement member 20 is connected to the pillar member 10 will be described below. However, two or more roof reinforcement members may be connected to the pillar member. A bead portion B is provided in each member to increase stiffness of the member. In the example shown in FIG. 1, an upper end of the pillar member 10 joined to an outside surface of the roof side rail 40 in the vehicle width direction, and an end of the roof reinforcement member 20 provided to be adjacent in the inside in the vehicle width direction of the roof side rail 40 are connected to each other via the pillar reinforcement member 30.

As shown in FIGS. 1 and 2, the pillar reinforcement member 30 is joined to the pillar member 10 and the roof reinforcement member 20. The pillar reinforcement member 30 is configured to be joined to the roof reinforcement member 20 through two structural elements separated in the vehicle width direction. In the present embodiment, two structural elements are provided to be separated in the vehicle width direction, and two sets of structural elements are provided to be separated in the vehicle body longitudinal direction. Moreover, three or more structural elements may be provided to be separated in the vehicle width direction, and three sets or more of structural elements may be provided to be separated in the vehicle body longitudinal direction. In the description below, for convenience, the structural element provided in the outside in the vehicle width direction is referred to as a first structural element, and the structural element provided in the inside in the vehicle width direction is referred to as a second structural element.

The first structural element is provided as joint means separated from the pillar reinforcement member 30, and is configured of bolts 31 (joint portions) which join the pillar reinforcement member 30 to the roof reinforcement member 20. In the present embodiment, the first structural element is configured of the bolts 31. However, the first structural element may be configured of joint means such as a rivet or welding. Moreover, in the present embodiment, bolt holes 21 and 35 through which bolts 31 pass are provided on the roof reinforcement member 20 and the pillar reinforcement member 30.

The second structural element is provided as at least one of latching means which configures a portion of the pillar reinforcement member 30, passes through the roof reinforcement member 20, and is configured of hook-shaped members 32 (latch portions) which are latched to the roof reinforcement member 20 when the pillar reinforcement member 30 is deformed by an external load F. In the present embodiment, the second structural element is formed by welding the hook-shaped members 32 to the pillar reinforcement member 30. However, the second structural element may be formed by bending a portion of the pillar reinforcement member 30 in a hook shape. In any case, when the pillar reinforcement member 30 is attached to the roof reinforcement member 20, the second structural element configures a portion of the pillar reinforcement member 30 in advance. Moreover, hook holes 22 through which the hook-shaped members 32 pass are provided on the roof reinforcement member 20.

The hook-shaped member 32 includes a protrusion 32*a* which is provided to protrude above from the pillar reinforcement member 30, and a bent portion 32*b* which is bent from the protrusion 32*a* and is provided in the outside in the vehicle width direction. In the state where the pillar reinforcement member 30 is attached to the roof reinforcement member 20, each of the protrusion 32*a* and the bent portion 32*b* restricts a movement of the pillar reinforcement member 30 in the vehicle width direction (right-left direction in FIG. 2) and the vehicle height direction (up-down direction in FIG. 2) within a predetermined range (also restricts the movement in the vehicle body longitudinal direction). In the present embodiment, in the hook-shaped member 32, the protrusion 32*a* is formed to be perpendicular or approximately perpendicular to an upper surface of the pillar reinforcement member 30, and the bent portion 32*b* is formed to be parallel or approximately parallel to the upper surface of the pillar reinforcement member 30. However, the hook-shaped member 32 and the hook hole 22 are formed in appropriate shapes, directions, and dimensions so that the hook-shaped member 32 is easily inserted into the hook hole 22 and the movement of the pillar reinforcement member 30 with respect to the roof reinforcement member 20 in the vehicle width direction and the vehicle height direction (also in the vehicle body longitudinal direction) is restricted to a predetermined range.

Next, with reference to FIG. 3, an assembly method of the vehicle upper-body structure according to the embodiment of the present invention will be described. FIG. 3 is a view showing the assembly method of the vehicle upper-body structure according to the embodiment of the present invention. Moreover, also in FIG. 3, for simplification of the description, the roof side rail 40 is not shown.

As shown in FIG. 3, in the vehicle upper-body structure, the pillar reinforcement member 30 is attached to the roof reinforcement member 20 (or the roof reinforcement member 20 is attached to the pillar reinforcement member 30) using the bolts 31 and the hook-shaped members 32. Moreover, the joining of the pillar reinforcement member 30 with respect to the pillar member 10 is performed before or after the attachment of the pillar reinforcement member 30 with respect to the roof reinforcement member 20, and is performed by fastening of a bolt 33 with respect to a bolt hole 36 (refer to FIG. 2) or the like.

First, as shown in FIG. 3(*a*), the hook-shaped members 32 are inserted into the hook holes 22 of the roof reinforcement member 20 in order of the bent portions 32*b* and the protrusions 32*a*. Accordingly, the hook-shaped members 32 abut the hook holes 22, and thus, the pillar reinforcement member 30 can be temporarily positioned with respect to the roof reinforcement member 20. Here, in FIG. 3(*a*), the positioning in the vehicle width direction is performed by abutting the protrusions 32*a* against the hook holes 22. However, the positioning in the vehicle height direction may be performed by abutting the bent portions 32a (of course, the positioning in the vehicle body longitudinal direction may be performed by abutting the bent portions in a depth direction).

Next, as shown in FIG. 3(b), in the state where the hook-shaped members 32 are positioned on the roof reinforcement member 20, at least one of the roof reinforcement member 20 and the pillar reinforcement member 30 is slightly moved in at least one direction (a direction shown by an arrow D in FIG. 3(b)) of the vehicle width direction, the vehicle height direction, and the vehicle body longitudinal direction, and thus, holes 21 and 35 of the roof reinforcement member 20 and the pillar reinforcement member 30 are correctly positioned. Accordingly, the pillar reinforcement member 30 can be finally positioned with respect to the roof reinforcement member 20. In this state, the bolts 31 are inserted into the bolt holes 21 and 35, the bolts 31 are screwed to female screw portions provided on inner surfaces of the bolt holes 21 and 35, female screw portions of nuts (not shown), or the like, and thus, the roof reinforcement member 20 and the pillar reinforcement member 30 are fastened with bolts.

As described with reference to FIG. 3, according to the vehicle upper-body structure according to the present embodiment, since the hook-shaped member 32 is provided as a portion of the pillar reinforcement member 30, compared to the case where the joining is performed at one point, the number of components is not increased. Moreover, since the hook-shaped member 32 is provided to pass through the roof reinforcement member 20, the pillar reinforcement member 30 can be easily positioned with respect to the roof reinforcement member 20 by the abutment of the hook-shaped member 32 with respect to the hook hole 22.

Next, with reference to FIGS. 4 and 5, a behavior when the external load F is applied from a side of a vehicle body to the vehicle upper-body structure according to the embodiment of the present invention will be described. FIG. 4 is a view showing the behavior when the external load F is applied from the side of the vehicle body to the vehicle upper-body structure according to the embodiment of the present invention, and FIG. 5 is a view showing the behavior when the external load F is applied from the side of the vehicle body to the vehicle upper-body structure according to the related art. Moreover, also in FIGS. 4 and 5, for simplification of the description, the roof side rail 40 is not shown. Moreover, the case where the external load F is applied to the pillar member 10 from the side of the vehicle body will be described below. However, a case where the external load F is applied to the pillar reinforcement member 30 from the upper side may be also described similarly.

As shown in FIG. 4(a), when a side collision or the like occurs, the external load F is applied to the pillar member 10 from the side of the vehicle body. If so, as shown in FIG. 4(b), a portion of the external load F is absorbed by deformation of the pillar member 10. Moreover, the unabsorbed external load F is transmitted from the upper portion of the pillar member 10 to the pillar reinforcement member 30 (moreover, the similar phenomenon is also generated in the roof side rail 40). Here, since the external load F is applied to the pillar reinforcement member 30 from the outside in the vehicle width direction, bolts 31 having higher yield strength than the hook-shaped members 32 are provided on the outside in the vehicle width direction of the pillar reinforcement member 30.

The external load F transmitted to the pillar reinforcement member 30 is absorbed by the deformation of the pillar reinforcement member 30. The deformation of the pillar reinforcement member 30 latches the hook-shaped members 32 to the roof reinforcement member 20 through the hook holes 22 in at least one direction (vehicle width direction in FIG. 4) of the vehicle width direction, the vehicle height direction, and the vehicle body longitudinal direction. Moreover, the unabsorbed external load F is transmitted to the roof reinforcement member 20 as axial forces A1 and A2 via the bolts 31 and the hook-shaped members 32, and is applied to the pillar reinforcement member 30 (and the roof reinforcement member 20) as a bending moment M having the bolts 31 and the hook-shaped members 32 as fulcrums. Moreover, in FIG. 4, the case where the axial forces A1 and A2 are applied as tensile forces and the bending moment M is applied as a clockwise moment is assumed. However, according to the state of the external load F, a compressive force or counterclockwise moment may be applied.

Here, since the movement of the pillar reinforcement member 30 with respect to the roof reinforcement member 20 is restricted to a predetermined range by the protrusions 32a and the bent portions 32b of the hook-shaped member 32, the external load F can be securely transmitted from the pillar reinforcement member 30 to the roof reinforcement member 20 in at least one of the vehicle width direction, the vehicle height direction, and the vehicle body longitudinal direction. Moreover, due to interference between the protrusions 32a and the roof reinforcement member 20 and interference between the bent portions 32b and the roof reinforcement member 20, stepwise energy absorption (absorption of the external load F) can be improved.

In addition, the bending moment M applied to the pillar reinforcement member 30 is subjected to a reaction force by stiffness (tension) of an intermediate portion 34 between the bolt 31 and the hook-shaped member 32 of the pillar reinforcement member 30. Moreover, as shown in FIG. 1, two sets or more of bolts 31 and hook-shaped members 32 are provided, the intermediate portions 34 between the bolts and the hook-shaped members of the pillar reinforcement member 30 are restrained at four points or more, and thus, bending stiffness can be increased by surface forces (tension) of the intermediate portions 34. Particularly, since the beads B or the like are provided on the intermediate portions 34, the bending stiffness can be increased.

On the other hand, as shown in FIG. 5, when a pillar reinforcement member 130 is fastened to a roof reinforcement member 120 with a bolt at one point in the vehicle width direction, the external load F, which is not absorbed by the deformation of the pillar reinforcement member 130, is transmitted to the roof reinforcement member 120 as an axial force A1' via a bolt 131, and is applied to the pillar reinforcement member 130 (and the roof reinforcement member 120) as bending moment M' having the bolt 131 as a fulcrum. Accordingly, in the vehicle upper-body structure shown in FIG. 5, the external load F which is not absorbed by the deformation of the pillar reinforcement member 130 cannot be securely transmitted from the pillar reinforcement member 130 to the roof reinforcement member 120.

In addition, although the pillar reinforcement member 130 resists the bending moment M' having the bolt 131 as the fulcrum, since the fulcrum of the bending moment M' is one point of the bolt 131, the pillar reinforcement member is easily bent. That is, since a reaction force having the bolt 131 as a force application point is generated with respect to the external load F applied to the pillar member 110, only small bending stiffness on the upper portion of the pillar member 110 can be obtained.

As described with reference to FIGS. 4 and 5, according to the vehicle upper-body structure of the present embodiment, when the pillar reinforcement member 30 is deformed by the external load F, since the hook-shaped members 32 are latched to the roof reinforcement member 20, load transmission efficiency from the pillar reinforcement member 30 to the roof reinforcement member 20 can be improved.

Moreover, since the movement of the pillar reinforcement member 30 is restrained with respect to the roof reinforcement member 20 by the bolts 31 and the hook-shaped members 32 separated in the vehicle width direction, the intermediate portions 34 between the bolts 31 and the hook-shaped members 32 of the pillar reinforcement member 30 are not easily bent, and thus, the bending stiffness of the upper portion of the pillar member 10 can be secured. In other words, instead of having only the bolts 31 as the force application points, since the bolts 31, the hook-shaped members 32, and the intermediate portions 34 between both members 31 and 32 are provided as the force application points, the bending stiffness of the upper portion of the pillar member 10 can be secured without an increase of a sectional force of the pillar reinforcement member 30 obtained by increasing a thickness of the member 30.

Moreover, also when the external load F is applied to the roof side rail 40 from the side or the upper side of the vehicle body, since the hook-shaped members 32 of the pillar reinforcement member 30 are latched to the roof reinforcement member 20, the external load F applied to the roof side rail 40 can be dispersed on the pillar reinforcement member 30.

As described above, according to the vehicle upper-body structure of the embodiment of the present invention, when the pillar reinforcement member 30 is deformed by the external load F, since the latch portions (hook-shaped members 32) are latched to the roof reinforcement member 20, the load transmission efficiency from the pillar reinforcement member 30 to the roof reinforcement member 20 can be improved. In addition, since the latch portions (hook-shaped members 32) are provided as a portion of the pillar reinforcement member 30, compared to the case where the joining is performed at one point, the number of components is not increased. Therefore, according to the vehicle upper-body structure of the embodiment of the present invention, the load transmission efficiency from the pillar reinforcement member 30 to the roof reinforcement member 20 can be improved without increasing the number of components.

In addition, since the joint portions (bolts 31) are provided at different positions from the latch portions (hook-shaped members 32) in the vehicle width direction, the intermediate portions between the latch portions and the joint portions of the pillar reinforcement member 30 are not easily bent, and thus, the bending stiffness of the upper portion of the pillar member 10 can be secured.

In addition, since the protrusions 32a and the bent portions 32b restrict the movement of the pillar reinforcement member 30 in the vehicle width direction and the vehicle height direction, the load transmission efficiency can be further improved. Moreover, when the assembly of the vehicle upper-body structure is performed, the pillar reinforcement member 30 can be easily positioned on the roof reinforcement member 20.

In addition, since the latch portions (hook-shaped members 32) are provided at further inner sides than the joint portions (bolts 31) in the vehicle width direction, the external load F applied from the side or the upper side of the vehicle body is easily transmitted to the joint portions provided on the outside in the vehicle width direction, and the transmission of the external load F to the latch portions can be decreased.

Moreover, the embodiment describes a preferred embodiment of the vehicle upper-body structure according to the present invention, and the vehicle upper-body structure according to the present invention is not limited to those described in the present embodiment. In the vehicle upper-body structure according to the present invention, the vehicle upper-body structure according to the present embodiment may be modified within a range which does not depart from the gist of the invention described in each claim, or may be also applied to other structures.

REFERENCE SIGNS LIST 10 and 110 . . . pillar member, 20 and 120 . . . roof reinforcement member, 30 and 130 . . . pillar reinforcement member, 40 . . . roof side rail, 31, 33, 131, and 133 . . . bolt, 32 . . . hook-shaped member, 32a . . . protrusion, 32b . . . bent portion, 34 . . . intermediate portion, 21, 35, and 36 . . . bolt hole, 22 . . . hook hole

The invention claimed is:

1. A vehicle upper-body structure comprising:
a pillar reinforcement member configured to connect an upper portion of a pillar member to a roof reinforcement member;
the pillar reinforcement member including at least one latch portion which becomes latched to the roof reinforcement member when the pillar reinforcement member is deformed by an external load,
wherein the at least one latch portion is configured to pass through an opening in the roof reinforcement member when the pillar reinforcement member is attached to the roof reinforcement member, the at least one latch portion includes a protrusion which is configured to protrude through the opening in the roof reinforcement member and restricts a movement of the pillar reinforcement member relative to the roof reinforcement member in a vehicle width direction by contacting an outward side of the opening tin the vehicle width direction when the pillar reinforcement member is deformed by an external load, and the at least one latch portion includes a bent portion which extends at a non-zero angle from the protrusion and restricts a movement of the pillar reinforcement member relative to the roof reinforcement member in a vehicle height direction, and
a joint portion of the pillar reinforcement member by which the roof reinforcement member is joined to the pillar reinforcement member, the joint portion located at a position different from a position of the at least one latch portion in the vehicle width direction, wherein the joint portion is located in line with the at least one latch portion in the vehicle width direction.

2. The vehicle upper-body structure according to claim 1, wherein the at least one latch portion is provided closer to a center of the vehicle in the vehicle width direction than the joint portion.

3. A vehicle upper-body structure comprising:
a pillar reinforcement member configured to connect an upper portion of a pillar member to a roof reinforcement member;
the pillar reinforcement member including at least one latch portion which becomes latched to the roof reinforcement member when the pillar reinforcement member is deformed by an external load,
wherein the at least one latch portion is configured to pass through an opening in the roof reinforcement member when the pillar reinforcement member is attached to the roof reinforcement member, the at least one latch portion includes a protrusion which is configured to protrude through the opening in the roof reinforcement member and restricts a movement of the pillar reinforcement member relative to the roof reinforcement member in a vehicle width direction, and the at least one latch portion includes a bent portion which extends at a non-zero angle from the protrusion and restricts a movement of the pillar reinforcement member relative to the roof reinforcement member in a vehicle height direction, and a joint portion of the pillar reinforcement member by which the roof reinforcement member is joined to the pillar reinforcement member, the joint portion located at a position different from a position of the at least one latch portion in the vehicle width direction, the joint portion located in line with the at least one latch portion in the vehicle width direction.

4. The vehicle upper-body structure according to claim 3, wherein the at least one latch portion is provided closer to a center of the vehicle in the vehicle width direction than the joint portion.

\* \* \* \* \*